United States Patent [19]

Maier et al.

[11] Patent Number: 4,690,582

[45] Date of Patent: Sep. 1, 1987

[54] CONNECTING ELEMENT FOR STRUCTURAL FRAMEWORK

[75] Inventors: Helmut Maier, Schonenbüch, Switzerland; Bruno Neumann, Eupen, Belgium; Ludwig R. Schaafhausen, Frankfurt am Main, Fed. Rep. of Germany

[73] Assignee: Exibelco GmbH, Basel, Switzerland

[21] Appl. No.: 787,425

[22] Filed: Oct. 15, 1985

[30] Foreign Application Priority Data

Oct. 16, 1984 [DE] Fed. Rep. of Germany ....... 3437805

[51] Int. Cl.$^4$ ........................... B25G 3/00; F16B 9/00
[52] U.S. Cl. .................... 403/252; 403/322; 403/255
[58] Field of Search ............... 403/252, 322, 255, 201, 403/194, 254, 264

[56] References Cited

U.S. PATENT DOCUMENTS

| 3,574,367 | 4/1971 | Jankowski . |
| 3,701,553 | 10/1972 | Vogt . |
| 4,345,849 | 8/1982 | Stenemann . |
| 4,455,103 | 6/1984 | Hackenberg ............ 403/322 X |
| 4,582,446 | 4/1986 | Salice ............ 403/407.1 X |

FOREIGN PATENT DOCUMENTS

| 1994083 | 9/1968 | Fed. Rep. of Germany . |
| 7421929 | 6/1974 | Fed. Rep. of Germany . |
| 7341203 | 6/1975 | Fed. Rep. of Germany . |
| 2732910 | 2/1979 | Fed. Rep. of Germany ...... 403/252 |
| 2239370 | 8/1980 | Fed. Rep. of Germany . |
| 8105710 | 7/1984 | Fed. Rep. of Germany . |
| 1477591 | 4/1967 | France . |

*Primary Examiner*—Andrew Kundrat
*Attorney, Agent, or Firm*—Kenyon & Kenyon

[57] ABSTRACT

A connector for detachably joining one profile section to another in a framework assembly comprises a housing having a bottom part and a lid connected to one another by means of snap-lock coupling elements. The housing is insertable into a longitudinal recess at one end face of a horizontal profile section. A latch is slidably disposed in the housing and has, at an end projecting from the housing, a hook for engaging an inwardly facing surface of a vertical profile section. At an end opposite the hook, the latch has a rectangular aperture traversed by a substantially cylindrical eccentric pin projecting from the housing of the connector into a transverse bore in the horizontal profile section. The eccentric pin is outwardly biased by a spiral compression spring disposed on a side of the latch opposite the hook and opposite an incline disposed on the inner side of a housing portion and engageable with a bent segment of the latch for producing a transverse motion of the hook during a terminal phase of a longitudinal motion of the latch.

28 Claims, 9 Drawing Figures

CONNECTING ELEMENT FOR STRUCTURAL FRAMEWORK

BACKGROUND OF THE INVENTION

This invention relates to a connecting element for detachably connecting sectional bars of a structural framework to one another.

In a structural framework assembly comprising various sectional bars or extrusions, at least some of the sectional bars, called "support profiles," have undercut longitudinal slots, while other sectional bars, called "edge profiles," are hollow profiles and accept a connecting element at an end face. The connecting element or lock consists of a housing, in which a mounting element is slidably disposed. The mounting element has at one end a single connecting hook projecting from an end face of the housing and is movable in a longitudinal direction by means of an eccentric pin which traverses an aperture in the mounting element. The eccentric pin has a handle or actuating end held, resiliently detented, in a transverse hole of the profile bar containing the connecting element, the actuating end of the eccentric pin being pushed out of the housing, in the manner of a pushbutton, and held in the hole of the profile bar by a spring engaging a side of the mounting element opposite the actuating end of the eccentric pin. The housing is provided on an inner surface with an incline engageable with a counter-incline or bent segment formed on the mounting element.

Various embodiments of such connecting elements are known and used in particular in the assembly of racks which are used in the construction of showrooms, stores or the like. The joint between a support profile and an edge profile coupled thereto by a connecting element should be extremely strong, on the one hand, but, on the other hand, should also be easy to assembly and disassemble.

As described in U.S. Pat. No. 4,455,103, one embodiment of a connecting element comprises a unitary support housing having a rising wedge surface on an inner surface of the housing and a mounting element which can be moved lengthwise within the housing, the mounting element taking the form of a strip of steel sheet which has a counter-incline or bent portion which is pushed against the wedge surface of the housing by the force of a spring integral with the mounting strip. At an end face of the housing, two coupling projections are firmly arranged, between which the mounting element moves, the mounting element and the coupling projections resting, upon completion of a clamping operation, against opposite sides of a longitudinal slot in a support section. The mounting element can be moved longitudinally relative to the lock by an eccentric pin, the mounting element executing not only a longitudinal motion but, by a camming engagement of the wedge-shaped incline in the housing with the bent portion of the mounting element, also a transverse motion. Through these motion components, occurring simultaneously, a particular secure and strong connection of two profile bars is to be achieved according to the teachings of U.S. Pat. No. 4,455,103.

The principles underlying the structure and operation of the connecting element of U.S. Pat. No. 4,445,103 had been previously disclosed in German Utility Model DE-GM No. 7341203. Improvements introduced by U.S. Pat. No. 4,455,103 were made with the objects of simplifying the structure of the connecting element, facilitating assembly and disassembly and providing for convenient insertion and, if necessary, removal of the connecting element from the sectional bars. It has been found that the assembly and disassembly of the connecting elements disclosed in U.S. Pat. No. 4,455,103 can present considerable difficulties. For example, the eccentric pin as well as the mounting element consisting of a strip of steel sheet metal must be introduced into the housing through an end face thereof. The insertion of the mounting element is not simple, because the spring tab formed from the sheet metal strip must be pushed against the body of the mounting element for the introduction to occur. In addition, a multiplicity of windows as well as inclined surfaces and ramps must be formed on the side walls of the housing to enable assembly and disassembly of the connecting element.

Because two mutually perpendicular motion cycles take place in a connecting element during the coupling operation proper, i.e., during engagement of a hook on the mounting element with an inwardly facing surface at a longitudinal slot in a support profile, shearing forces occur which on the one hand stress the profile bars additionally and, on the other hand, can lead to an unintended release of the connection.

An object of the present invention is to provide an improved connecting element of the above-described type.

Another, more particular, object of the present invention is to provide such a connecting element which is easy to manufacture.

Another particular object of the present invention is to provide such a connecting element which forms a secure, heavily stressable connection between sectional bars, which connection can not be broken unintentionally.

Yet another object of the present invention is to provide such a connecting element in which the coupling operation gives rise to reduced stresses and strains and whereby the connected profile bars are stressed as little as possible.

SUMMARY OF THE INVENTION

A connecting element in accordance with the present invention is utilized for detachably joining an elongate first sectional bar to an elongate second sectional bar, the first sectional bar having a longitudinal recess extending inwardly from one end face thereof and a transversely extending bore communicating with the recess substantially at an inner end thereof. The second sectional bar is provided with a longitudinally extending slot and at least one undercut longitudinal flange along one side of the slot.

A connecting element in accordance with the invention comprises an elongate housing insertable into the recess at the one end of the first sectional bar, the housing including two housing portions. An elongate mounting element is slidably disposed in the housing and has an aperture at one end, a hook at an opposite end and a bent segment between the aperture and the hook. The hook projects from the housing and is engagable with a rearwardly facing surface of the flange of the second sectional bar. The housing is provided with several actuating features engagable with the mounting element for shifting the element in a longitudinal direction in the housing and for moving the hook at the one end of the mounting element in a transverse direction during a portion of a longitudinal stroke of the mounting element. The actuating features include a manipulable eccentric pin transversely and rotatably mounted in the housing. The eccentric pin traverses the aperture in the mounting element and at least a portion of the bore in the second sectional bar. The actuating features further include an incline in the housing engagable by the bent segment of the mounting element during a longitudinal stroke thereof caused by rotation of the eccentric pin. A compression spring is provided in the housing, the spring engaging the mounting element on a side thereof opposite the incline in the housing and opposite the hook at one end of the mounting element, whereby the mounting element executes solely longitudinal motion during a terminal portion of an inwardly directed locking stroke bringing the hook into engagement with the rearwardly facing surface of the flange.

Owing to the fact that the housing of the connecting element in accordance with the invention is designed in two portions, no guiding surfaces of any kind need be provided in the housing for the purpose of introducing the mounting element and the eccentric pin into the housing. These parts need only be placed into one of the housing portions, whereupon the housing may be closed. Because the mounting element is designed as a latch subjected to only longitudinal motion during a terminal portion of an inwardly directed locking stroke, transverse moments no longer occur during the coupling operation proper. The absence of such transverse moments results in a simple tightening of the latch and leads to the establishment of a strong, undetachable connection.

In accordance with a feature of the present invention, the eccentric pin includes a head portion extending into the bore of the second sectional bar and further includes an eccentric cam portion traversing the aperture in the mounting element and laterally displaced with respect to the head portion of the eccentric pin. A support washer coaxial with the head portion is disposed between the head portion and the eccentric cam portion.

The novel structure of the eccentric pin in accordance with the present invention facilitates the motion of the mounting element solely in a longitudinal direction during a final portion of a locking stroke. The design of the eccentric pin obviates the need for additional guidance and control devices on the mounting element or in the housing.

The housing advantageously consists of a bottom part and a lid. Thus, the connecting element may be simply and easily assembled by arranging the mounting element and the eccentric pin in the bottom part of the housing and subsequently sealing the lid to the bottom part. The closure of the housing and the firm attachment of the lid to the bottom part can be achieved, in accordance with the invention, in a simpler manner by providing the bottom part with at least one recess and providing the lid with a post or lug insertable into the recess.

In accordance with a particular embodiment of the present invention, the bottom part has a pair of sleeve-like or cylindrical recesses for receiving respective cylindrical posts or lugs disposed on the lid. Preferably, the cylindrical posts have approximately the same transverse dimensions, i.e., the same diameters, as the respective cylindrical recesses, so that the cylindrical posts are receivable in the respective recesses in a snap-lock fit. Such a snap-lock fit insures a permanent coupling of the bottom part and the lid and thereby eliminates the possibility of malfunction owing to a separation of the housing portions.

In accordance with a particular feature of the present invention, the bottom part has an outer side facing away from the lid and the cylindrical recesses are closed on that outer side. This feature prevents the disassembly of the connecting element into its component parts and serves to reduce the likelihood that foreign matter will be introduced into the housing interior.

Pursuant to particular features of the present invention, the cylindrical recesses are disposed at opposite ends of the bottom part of the housing and one of the recesses is centrally disposed with respect to a longitudinal center line of the bottom part, while the other recess is laterally shifted relative to that center line. The lateral displacement of the one recess enables a disposition thereof in a region of reinforced housing material on the bottom part, whereby larger forces may be transmitted to and through the bottom part.

In accordance with a very advantageous embodiment of the present invention, the bottom part is formed on an inner side, i.e., on a side facing the lid, with a depression for receiving the spring. The depression is advantageously circular, while the spring is a commercially available simple spiral spring. In this embodiment of the invention, an unambigous positioning of the spring in the housing can be achieved.

Reinforcement ribs are advantageously provided on the outer side of the bottom part for increasing the load-carrying capacity thereof while maintaining a small wall thickness of the housing. The ribs preferably extend longitudinally approximately over the entire length of the bottom part.

A particular simple mounting of the eccentric pin is achieved by the provision in the lid of a stepped passage opening for the head portion of the pin, the support disc of the eccentric pin resing against the step.

The connecting element according to the invention is not only of particular simple design and assembly, but is also extremely light particularly because it can be made of plastic. The connecting element is utilizable even under the most extreme loads when the bottom part, as well as the lid, consists of fiberglass-reinforced plastic.

The torques arising from the rotary motion of the eccentric pin are compensated, according to a further particular feature of the invention, by the providing the mounting element or latch with a recess or cutout in the vicinity of the laterally shifted recess in the bottom part, the lengthwise edge of which cutout engages an inwardly projecting portion of the bottom part. According to the invention, this projecting portion of the bottom part is formed by an accumulation of material. The cooperation of the inwardly projecting portion on the bottom part with the lengthwise edge of the mounting element creates additional support for the mounting element, which prevents torsional forces possibly taken up by the latch from being transmitted directly to the relatively thin side wall of the bottom part of the housing. This inwardly projecting portion is laterally arranged at one end of the bottom part and is provided with the recess for receiving the laterally shifted post or pin on the lid. Additional reinforcement for the bottom part of housing is thereby achieved.

In order to provide, in a particular simple manner, stops for the rotary motion of the eccentric pin, the aperture provided in the mounting element and traversed by the eccentric pin is rectangular, the longitudinal axis of the aperture extending perpendicularly to the longitudinal axis of the mounting element. The dimensions of the aperture must be matched, of course, to the dimensions of the eccentric pin.

A particularly important feature of the invention is that the connecting hook protruding from the end face of the housing is bent toward the lid, whereby the connecting hook travels only longitudinally, i.e., in the direction of tensile motion, during a clamping process.

According to a further embodiment of the invention, the inner side of the bottom housing part has an incline or sloped section opposite the incline on the lid. The bent portion of the mounting element comes into engagement on one side with the incline on the inside of the lid and successively, on the other side, with the incline on the bottom part of the housing. The incline on the inside of the lid serves to move the latch at the end of its outward motion transversely from the pulling motion line at a side of the housing toward the center of the housing so that the connecting hook is disposed in the area of the slot of the support profile, thereby enabling separation of the edge profile containing the connecting element from the support profile.

The incline formed in the bottom part of the housing serves as a support for the mounting element when the same is out of engagement with the incline on the inside of the lid. This supplementary support is especially useful if a connection between two sectional bars is established, because the connecting hook then cannot be moved transversely toward the center of the housing and released unintentionally.

A recess which is closed off from the outside may also be provided in the bottom part of the housing for a bearing portion of the eccentric pin. Thus, the entire outer side of the bottom housing part has no opening of any kind.

According to further features of the invention, the eccentric cam portion of the eccentric pin has approximately the same diameter as the bearing portion thereof and the support disc or washer has a diameter which is larger than that of the head portion which in turn is larger than the diameter of the eccentric cam portion and the bearing portion.

DETAILED DESCRIPTION

Figure 1:
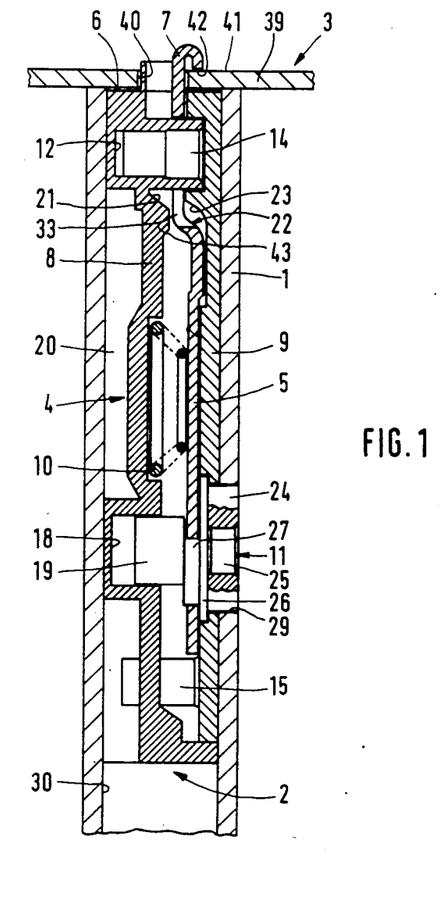
FIG. 1 is a longitudinal cross-section view of a connector or lock according to the present invention, showing a bottom part, a lid, a mounting element or latch and an eccentric pin.

As illustrated in FIG. 1, a locking or connecting element 2 is disposed in a longitudinal recess 30 extending from the end face of a hollow sectional bar or profile member 1. A connecting hook 7 projects from one end of the connector 2 through an entrance opening or longitudinal slot 40 in another sectional member or profile 3. In an actuated state of connector 2, an edge 42 of hook 7 engages an inwardly facing surface 41 of a flange 39 defining one edge of slot 40, whereby the two sectional bars or profiles 1 and 3 are joined to one another. Sectional bars 1 and 3 may take the form of an edge profile and a support profile, respectively, of a framework exemplarily for building exhibition stands or display showcases, each edge profile extending horizontally between a pair of vertical support profiles.

Lock or connector 2 comprises a housing 4 in which a mounting element or latch 5 is slidably disposed for limited motion in a longitudinal direction. Housing 4 is made of a bottom part 8 and a lid 9 which are connected to one another as described in detail whereinafter. Connecting hook 7 is formed at an end of latch 5 protruding from an end face 6 of housing 4 and is bent back on itself towards lid 9.

In addition to latch 5, housing 4 contains a spiral compression spring 10 and an eccentric pin 11.

Figure 6:
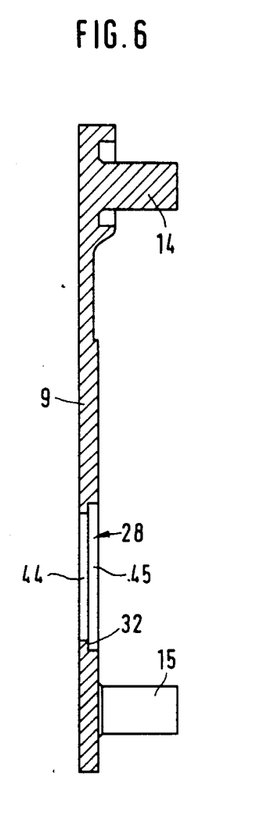
FIG. 6 is a longitudinal cross-sectional view of the lid illustrated in FIG. 1.
Figure 7:
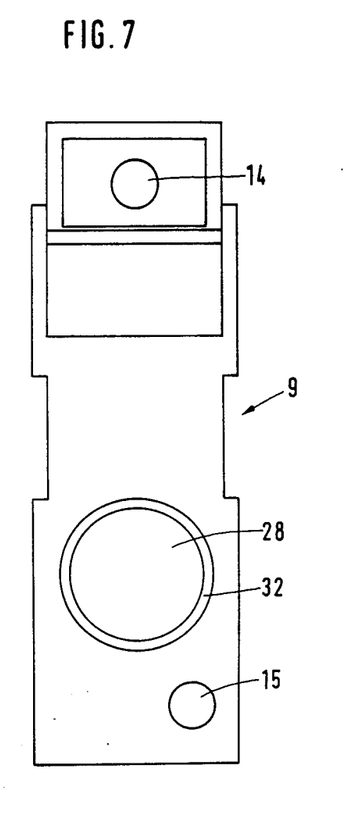
FIG. 7 is an elevational view of the lid shown in FIGS. 1 and 6.

As illustrated in FIGS. 2–5, bottom part 8 is provided at opposite ends with two sleeve-like or cylindrical recesses 12 and 13. Recesses 12 and 13 are closed on an outer side 16 of bottom part 8 (FIG. 5), i.e., on a side of bottom part 8 facing away from lid 9 and mounting element or latch 5. Recesses 12 and 13 receive respective cylindrical posts or lugs 14 and 15 integrally formed on lid 9 (see FIGS. 1, 6 and 7). The diameters of posts 14 and 15 are approximately equal to the diameters of recesses 12 and 13, respectively, whereby posts 14 and 15 are inserted in recesses 12 and 13 in a snap-lock fit.

Figure 2:
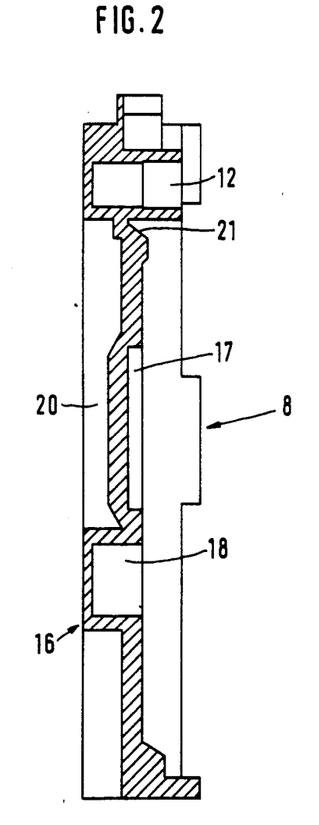
FIG. 2 is a longitudinal cross-sectional view of the bottom part illustrated in FIG. 1.
Figure 3:
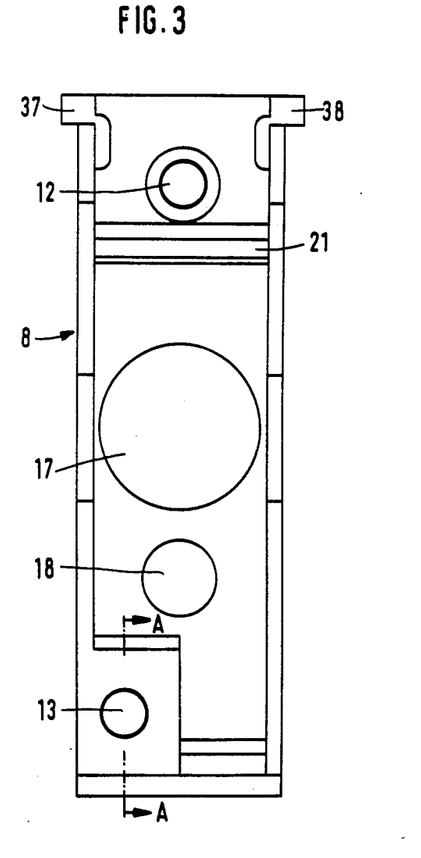
FIG. 3 is an elevational view of the inner side of the bottom part illustrated FIGS. 1 and 2.

As shown in FIGS. 2 and 3, bottom part 8 of housing 4, is formed with a circular depression or indentation 17 in which compression spring 10 is seated. Depression 17 serves to fix the position of the spring in housing 4.

Bottom part 8 of housing 4 is provided with a further recess 18 in a region between recess 13 and depression 17, recess 18 serving as a bearing bushing for receiving a bearing portion or journal 19 of eccentric pin 11. Like recesses 12 and 13, recess 18 is closed on the back or outer side 16 of bottom part 8.

Figure 4:
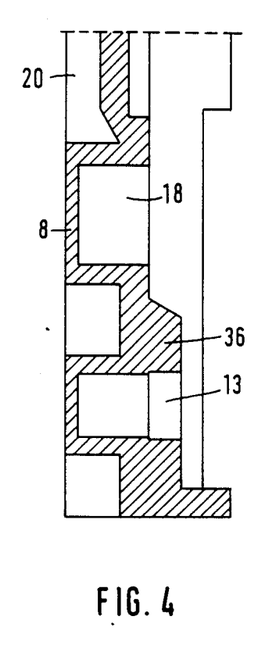
FIG. 4 is a longitudinal cross-sectional view taken along line A—A in FIG. 3.
Figure 5:
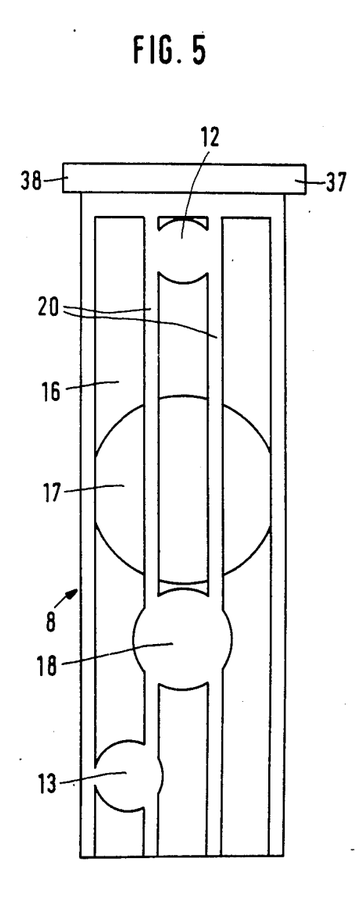
FIG. 5 is an elevational view of an outer side of the bottom part illustrated in FIGS. 1 and 2.

As illustrated in FIGS. 2 and 4, recesses 12 and 13 are disposed in locally thick regions of bottom part 8, these regions representing accumulations of fiberglass-reinforced plastic of which bottom part 8 consists. As illustrated in FIG. 5, bottom part 8 is provided on outer side 16 with a multiplicity of longitudinally extending reinforcement ribs 20 which extend approximately the entire length of outer side 16.

Figure 8:
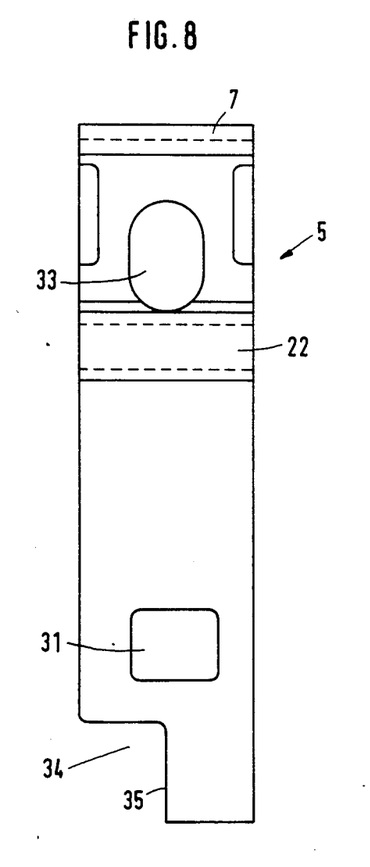
FIG. 8 is an elevational view of the mounting element illustrated in FIG. 1.
Figure 9:
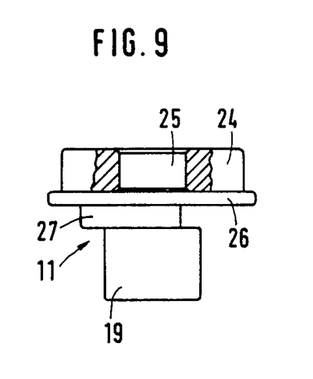
FIG. 9 is a side view, partially in cross-section, of an eccentric pin illustrated in FIG. 1.

As illustrated in FIGS. 1, 2 and 3, bottom part 8 is provided in the vicinity of recess 12 with a sloped region or incline 21. Sloped region 21 cofunctions with a bent segment 22 of latch 5 (see FIGS. 1 and 8) and with an incline 23 on an inner side of lid 9 to control the transverse position of hook 7 in accordance with the longitudinal position of latch 5. Latch 5 can be moved in the longitudinal direction of connecting element 2 by a rotation of eccentric pin 11. As shown in FIGS. 1 and 9, eccentric pin 11 comprises a head portion 24 provided with a centrally disposed opening 25 for receiving a turning tool. Juxtaposed to head portion 24 is a support washer 26 arranged concentrically therewith and having a diameter slightly larger than the diameter of head portion 24. Integrally connected to support washer 26 is an eccentric disc or cam portion 27 which in turn is integrally connected to the bearing journal 19 of eccentric pin 11.

On a side of housing 4 opposite recess 18 in bottom part 8, lid 9 has an opening 28 which includes an outer portion 44 and an inner portion 45, the diameter of the inner portion being larger than the diameter of the outer portion, whereby opening 28 has an annular step 32 in lid 9. As illustrated in FIG. 1, head portion 24 of eccentric pin 11 traverses the outer portion 44 of opening 28 and extends into a traverse drill hole or bore 29 located in profile or sectional bar 1 at an inner end of connector 2. Preferably, head portion 24 of eccentric pin 11 protrudes from housing 4 of connector 2 by a distance apprxomately equal to the thickness of the wall of edge profile 1.

Eccentric pin 11 is held in the detented position shown in FIG. 1 by spring 10 which is compressed between the inner side of bottom part 8 and mounting latch 5 and which thereby functions to push latch 5 against lid 9. As illustrated in FIG. 8, latch 5 has a rectangular aperture 31 traversed by eccentric pin 11 and, in particular, by eccentric cam disc 27 thereof. Latch 5 rests against support washer 26 of eccentric pin 11 which in turn is seated against step 32 of the lid opening 28. Aperture 31 is designed so that eccentric pin 11 cannot execute a complete revolution, but comes to a stop at a side wall or edge of aperture 31, whereby the travel distance of latch 5 in a longitudinal direction is limited.

As illustrated in FIG. 8, latch 5 has between bent segment 22 and connecting hook 7 a longitudinally extending oval passage or opening 33 traversed by post 14 in an assembled state of connector or lock 2. At an end opposite hook 7, latch 5 is provided with a rectangular recess or cutout 34 having a longitudinal or lengthwise edge 35 which engages and is arrested by a side wall of an inwardly projecting portion 36 (FIG. 4) of bottom part 8 upon a rotating of eccentric pin 11. Inwardly projecting portion 36 takes the form of an accumulation of the plastic material forming the bottom part 8 of the housing 4 in a region about recess 13.

Connector 2 is assembled by placing bottom part 8, its outer side 16 down, on a horizontal surface and seating compression spring 10 in depression 17. Eccentric pin 11 is then inserted into lid 9 from the inner side thereof, support washer 26 coming into engagement with step 32 of opening 28. At this point, latch 5 is placed against the inner side of lid 9 such that eccentric pin 11 projects through aperture 31 and latch 5 is in contact with a side of suppot washer 27 opposite step 32. The assembled unit, consisting of lid 9, eccentric pin 11 and latch 5 is then placed on bottom part 8 such that posts 14 and 15 of lid 9 are aligned with recesses 12 and 13, respectively, in bottom part 8, whereupon a downward application of force causes post 14 and 15 to be seated in recesses 12 and 13 in a snap-lock fit. By a proper design of post 14 and 15 and associated recesses 12 and 13, housing 4 can be opened only by damaging it.

The transverse dimensions of housing 4 of connector 2 are slightly smaller than the transverse dimensions of prismatic recess 30 (FIG. 1), whereby insertion of connector 2 into recess 30 is facilitated. Connector 2 is provided at its one end face 6 with a pair of lateral projections 37 and 38 which insure that connector 2 does not slide completely into edge profile 1.

The distance of transverse bore 29 from the end face of edge profile 1 is slightly greater than the distance of eccentric pin 11 from end face 6 of connector 2 so that, upon insertion of connector 2 into recess 30 of edge profile 1, end face 6 is slightly spaced inwardly from the end of edge profile 1. This spacing facilitates a firm attachment of edge profile 1 to support profile 3 by means of connector 2.

In order to introduce connector 2 into recess 30 of edge profile 1, head portion 24 of eccentric pin 11 is pushed into housing 4 against the force exerted by spring 10. Upon the insertion of connector 2 into recess 30 so that eccentric pin 11 is aligned with bore 29, spring 10 acts through latch 5 to push eccentric pin 11 outwardly so that head portion 24 extends into bore 29 and so that support washer 26 is seated on step 32. In this position, head portion 24 has an outer surface approximately flush with the outside wall of edge profile 1.

In order to join edge profile 1 to support profile 3 by means of connector 4, hook 7 must be shifted temporarily from the actuated position shown in FIG. 1 to an unactuated or central position. An operating tool is inserted into opening 25 in head portion 24 of eccentric pin 11 and rotated, whereby, through the camming coaction of eccentric cam portion 27 of eccentric pin 11 and a pair of opposite edges of aperture 31, latch 5 is moved in a longitudinal direction towards the end faces of edge profile 1 and connector 2. During this outward movement, bent segment 22 of latch 5 engages incline 23 on the inside of lid 9. Upon continued rotary motion of eccentric pin 11 and continued longitudinal motion of latch 5, a camming coaction of bent segment 22 and incline 23 causes a transverse motion of an outer end of latch 5, including hook 7, during a terminal phase of an outward longitudinal stroke of latch 5. The motion of latch 5 is arrested upon the contact of eccentric cam portion 27 with one side of aperture 31 and the clamping of eccentric pin 11.

In the end position of latch 5, connecting hook 7 can be introduced into entrance opening or entrance opening or undercut longitudinal slot 40 of support section 3. Eccentric pin 11 is then rotated in the opposite direction, hook 7 being shifted laterally from a center line position during a running of bent segment 22 down incline at 23. Upon the completion of the transverse motion of hook 7, and upon the concomitant engagement of latch 5 with the inner side of lid 9, a relatively large distance (approximately 1 or 2 mm) exists between the end edge 42 of connecting hook 7 and inwardly facing surface 41 of flange 39 of support profile 3. Upon continued rotation of eccentric pin 11, only a longitudinal motion is executed by latch 5. The locking process is terminated upon the engagement of edge 42 of hook 7 with inwardly facing surface 41 of undercut flange 39. Locking is accomplished by clamping eccentric pin 11 at a lateral surface thereof to a lateral surface of aperture 31 in latch 5. It is to be noted that in the locked stated of conncter 2, only longitudinal forces bear upon latch 5, owing in part to the substantially perpendicular orientation of latch 5 with respect to flange 39 of support profile 3.

As illustrated in FIG. 1, sloping region or incline 21 on the inner side of bottom part 8 lies along an inward rise or projection 43 which has a function of bracing latch 5 against unintentional pushing in the center of latch 5 which pushing would release the connection. Incline 21 also serves as a guide for latch 5 during an initial phase of a retraction or inwardly directing locking stroke of latch 5.

Although the invention has been described in terms of particular embodiments and applications, one of ordinary skill of the art, in light of this teaching, can generate additional embodiments and modifications without departing from the spirit or exceeding the scope of the claimed invention. Accordingly, it is to be understood that the descriptions and illustrations herein are proffered to facilitate comprehension of the invention and should not be construed to limit the scope thereof.

What is claimed is:

1. A connecting element for detachably joining an elongate first sectional bar to an elongate second sectional bar, the first sectional bar having a longitudinal recess extending inwardly from one end face thereof and a transversely extending bore communicating with said recess substantially at an inner end thereof, the second sectional bar being provided with a longitudinally extending slot and at least one undercut longitudinal flange along one side of said slot, said connecting element comprising:

an elongate housing insertable into the recess at the one end face of the first sectional bar, said housing including two housing portions;

an elongate mounting element slidably disposed in said housing, said mounting element having an aperture at one end, a hook at an opposite end and a bent segment between said aperture and said hook, said hook protruding from said housing and being engageable with a rearwardly facing surface of the flange of the second sectional bar;

actuating means in said housing and engageable with said mounting element for shifting same in a longitudinal direction in said housing and for moving said hook in a transverse direction during a portion of a longitudinal stroke of said mounting element, said actuating means including a manipulable eccentric pin transversely and rotatably mounted in said housing and traversing said aperture and at least a portion of said bore, said actuating means further including an incline in said housing engageable by said bent segment of said mounting element during a longitudinal stroke thereof caused by rotation of said eccentric pin; and means for inducing said mounting element to execute solely longitudinal motion during a terminal portion of an inwardly directed locking stroke bringing said hook into engagement with said rearwardly facing surface of said flange, said means for inducing including a compression spring in said housing, said spring engaging said mounting element on a side thereof opposite said incline and said hook.

2. The connecting element defined in claim 1 wherein said eccentric pin includes a head portion extending into said bore, an eccentric cam portion traversing said aperture and laterally displaced with respect to said head portion, and a support washer coaxial with said head portion and disposed between said head portion and said eccentric cam portion, said eccentric pin being outwardly biased in said housing by said spring.

3. The connecting element defined in claim 2 wherein said housing portions consist of a bottom part and a lid.

4. The connecting element defined in claim 3 wherein said bottom part has at least one recess and said lid has a post insertable into said one recess.

5. The connecting element defined in claim 4 wherein said bottom part has a pair of cylindrical recesses and said lid has a pair of cylindrical posts each seatable in a respective one of said cylindrical recesses.

6. The connecting element defined in claim 5 wherein said cylindrical posts have approximately the same transverse dimensions as said respective ones of said cylindrical recesses so that said cylindrical posts are receivable in said respective ones of said cylindrical recesses in a snap-lock fit.

7. The connecting element defined in claim 6 wherein said bottom part has an inner side facing said lid and wherein said cylindrical recesses are closed on the outer side of said bottom part.

8. The connecting element defined in claim 5 wherein said cylindrical recesses are disposed at opposite ends of said bottom part.

9. The connecting element defined in claim 8 wherein one of said cylindrical recesses is centrally disposed with respect to a longitudinal center line of said bottom part, the other of said cylindrical recesses being laterally shifted relative to said center line.

10. The connecting element defined in claim 3 wherein said bottom part has an inner side facing said lid and wherein said bottom part is formed on said inner side with a depression, said spring being seated in said depression.

11. The connecting element defined in claim 10 wherein said depression is circular.

12. The connecting element defined in claim 11 wherein said spring is a coil spring.

13. The connecting element defined in claim 3 wherein said bottom part has an outer side facing away from said lid and wherein said bottom part is provided on said outer side with a plurality of reinforcement ribs.

14. The connecting element defined in claim 13 wherein said ribs extending longitudinally on said outer side of said bottom part.

15. The connecting element defined in claim 14 wherein said ribs have a first length and said bottom part has a second length, said first length being approximately equal to said second length.

16. The connecting element defined in claim 3 wherein said lid is provided with a circular opening having an outer portion of a first diameter and an inner portion of a second diameter larger than said first diameter, whereby said lid has at a periphery of said opening an annular step facing said bottom part, said head portion of said eccentric pin traversing said outer portion of said opening and said support washer being disposed in said inner portion of said opening so that said support washer engages said step.

17. The connecting element defined in claim 1 wherein said housing consists essentially of synthetic resin.

18. The connecting element defined in claim 17 wherein said housing portions each consists essentially of fiberglass-reinforced plastic.

19. The connecting element defined in claim 9 wherein said bottom part has an inner side facing said lid and an inwardly projecting portion on said inner side in a region about said other of said cylindrical recesses, said mounting element having a lengthwise edge terminating at said inwardly projecting portion.

20. The connecting element defined in claim 19 wherein said inwardly projecting portion is formed as an accumulation of material of which said bottom part consists.

21. The connecting element defined in claim 1 wherein said mounting element has a longitudinal axis and wherein said aperture is rectangular and has a longitudinal axis oriented perpendicularly to the longitudinal axis of said mounting element.

22. The connecting element defined in claim 3 wherein said incline is disposed on said lid, said hook is bent towards said lid, and said spring is disposed between said mounting element and said bottom part.

23. The connecting element defined in claim 22 wherein said bottom part has an inner side facing said lid and is formed on said inner side with a sloped region substantially opposite said incline.

24. The connecting element defined in claim 1 wherein each of said housing portions has an inner side facing the other of said housing portions and wherein said incline is provided on the inner side of one of said housing portions, the other of said housing portions being formed with on its inner side with a sloped region substantially opposite said incline.

25. The connecting element defined in claim 3 wherein said eccentric pin further includes a bearing portion at an end opposite said head portion, said bottom lpart including bearing recess, said bearing portion being at least partially inserted into said bearing recess.

26. The connecting element defined in claim 25 wherein said eccentric cam portion has approximately the same diameter as said bearing portion.

27. The connecting element defined in claim 26 wherein said support washer has a diameter larger than the diameter of said head portion and wherein the diameter thereof is larger than the diameter of said bearing portion and the diameter of said eccentric cam portion.

28. The connecting element defined in claim 2 wherein said support washer has a diameter larger than the diameter of said head portion, and wherein the diameter thereof is larger than the diameter of said eccentric cam portion.

* * * * *